United States Patent [19]
Okumura et al.

[11] Patent Number: 5,396,821
[45] Date of Patent: Mar. 14, 1995

[54] APPARATUS AND METHOD OF MACHINING ARTICLE OF ECCENTRIC CONFIGURATION

[75] Inventors: Takeshi Okumura; Katsuyoshi Kitagawa, both of Niwa, Japan

[73] Assignee: Okuma Corporation, Nagoya, Japan

[21] Appl. No.: 54,755

[22] Filed: Apr. 27, 1993

[30] Foreign Application Priority Data

Apr. 30, 1992 [JP] Japan ................................ 4-111007

[51] Int. Cl.$^6$ ...................... B23B 41/04; B23Q 15/02
[52] U.S. Cl. .................................. 82/1.3; 364/474.02;
364/474.29
[58] Field of Search ................... 82/1.2, 1.3, 1.4, 131;
364/474.02, 474.29

[56] References Cited
FOREIGN PATENT DOCUMENTS

| 3627364 | 9/1987 | Germany | ................................ | 82/1.3 |
| 58120 | 1/1993 | Japan . | | |
| 542452 | 2/1993 | Japan . | | |

*Primary Examiner*—William E. Terrell
*Attorney, Agent, or Firm*—Spensley Horn Jubas & Lubitz

[57] ABSTRACT

An eccentric-shape machining apparatus as well as an eccentric-shape machining method are provided which can efficiently and accurately bore, contour or thread a workpiece about any position other than the rotational center of the workpiece. The workpiece is rotatably driven while controlling the rotational phase of the workpiece. A rotating tool spindle adapted to mount a cutting tool is rotatably driven while controlling the rotational phase of the rotating tool spindle. The rotating tool spindle is mounted on a cutting head which is controllably fed and positioned in Z-axis extending parallel to X-axis perpendicular to the axis of the rotating tool spindle. During one complete revolution of the workpiece, the rotational phases of the main spindle and rotating tool spindle and the movement of the cutting head in the X-axis direction are simultaneously controlled such that the cutting tool is brought into contact with the inner and outer peripheries of the workpiece by a given depth of cut. At the same time, the movement of the cutting head in the Z-axis direction is controlled. As well as the work rotation mode described above, the work oscillation mode can be carried out.

11 Claims, 25 Drawing Sheets

$\theta_1 = 90°$ $\theta_1 = 135°$ $\theta_1 = 180°$ $\theta_1 = 225°$ $\theta_1 = 270°$ $\theta_1 = 315°$ $\theta_1 = 90°$ $\theta_1 = 135°$ $\theta_1 = 270°$ $\theta_1 = 315°$

APPARATUS AND METHOD OF MACHINING ARTICLE OF ECCENTRIC CONFIGURATION

BACKGROUND OF THE INVENTION

1. Field of the Invention

The present invention relates an eccentric-shape machining apparatus and method of using a machine tool such as a lathe or the like to perform a machining operation on a workpiece about an eccentric center different from the rotational center of the workpiece, the machining operation including boring, contour shaping, large-thread cutting and specific-thread cutting.

2. Description of the Related Art

As a general purpose machine, there has broadly been used a lathe in which a workpiece is held and rotated by a chuck mounted on a main spindle and a cutting tool is mounted on a cutting head positioned opposite to the workpiece, the cutting tool being driven while being controlled in a biting direction perpendicular to the rotational axis of the workpiece (X-axis direction) and also in a feed direction parallel to the rotational axis of the workpiece (Z-axis direction).

In such a lathe, thread cutting is carried out by first mounting a threading bit 2 on a cutting head 1, as shown in FIG. 1. Torque is then transmitted from an X-axis feed motor 6 to the cutting head 1 through an X-axis feed screw 7 so that the cutting head 1 will be driven in the X-axis direction to set a desired depth of cut. At the same time, torque is transmitted from a Z-axis feed motor 8 to the cutting head 1 through a Z-axis feed screw 9 such that the cutting head 1 will be controllably fed along the length of the workpiece with a desired pitch in synchronism with the rotation of the workpiece that is held by a chuck 3.

However, when it is desired to form a female or male thread on the workpiece by the use of the threading bit while the workpiece is being rotated in the aforementioned machine, the thread cutting can be carried out with any desired diameter or pitch, but cannot be performed about any eccentric center different from the rotational center of the workpiece. In order to overcome such a problem, it has recently been proposed to use a compound machining lathe in which a rotating tool spindle 10 is mounted on the cutting head 1 as shown in FIG. 2, the rotational phase ($\theta$1) of the main spindle for rotating the chuck 3 by which the workpiece 4 is held being controlled to make a compound machining. Such a compound machining lathe comprises a tool such as a tap, die or boring bar 11 that is mounted on the rotating tool spindle 10. Such a tool can thread or bore the workpiece about any position that is indexed by the main spindle drive and X-axis drive. In the example of FIG. 2, the tapping is carried out about a position P that is eccentric from the rotational center O of the workpiece 4.

SUMMARY OF THE INVENTION

However, the prior art machine of FIG. 2 can be used only to machine the workpiece with the diameter or pitch determined by the tap used, but cannot be utilized particularly to machine a large-diameter thread of about M100, variable pitch thread, tapered thread or the like. In addition, the boring bar is hardly used to form a large-diameter aperture since its ability is limited by the diameter of a tool used or by the ability of the rotating tool spindle.

It is therefore an object of the present invention to provide an eccentric-shape machining apparatus and method which can efficiently and accurately machine a bore, contour, large-diameter thread or specific thread in a workpiece about any position different from the rotational center of the workpiece.

To this end, the present invention provides an eccentric-shape machining apparatus for threading a workpiece about a position different from the rotational center of the workpiece, said apparatus comprising (1) a main spindle on which a chuck for holding the workpiece is mounted, (2) a rotating tool spindle on which a cutting tool can be mounted in a direction perpendicular to the axis of the cutting tool, (3) main spindle drive means for rotatably driving the main spindle while controlling the rotational phase ($\theta$1) of the workpiece, (4) rotating tool spindle drive means for rotatably driving the rotating tool spindle while controlling the rotational phase ($\theta$2) of the rotating tool spindle, (5) feed drive means for feeding the rotating tool spindle relative to the workpiece in a biting direction (X-axis direction) and in a feed direction (Z-axis direction) while controlling the position of the rotating tool spindle, and (6) numerical control means for controlling the rotational phases of the workpiece and rotating tool spindle in synchronism with the biting movement of the rotating tool spindle such that the cutting tool is brought into contact with the inner or outer periphery of the workpiece with a given depth of cut during one complete revolution of the workpiece and for simultaneously controlling the feed of the rotating tool spindle.

In the eccentric-shape machining apparatus of the present invention, the workpiece is held by the chuck on the main spindle while the cutting tool is mounted on the rotating tool spindle in a direction perpendicular to the axis of the cutting tool. The workpiece is machined by the cutting tool when the workpiece is being rotatably driven while the rotational phase $\theta$1 of the workpiece is being controlled by the main spindle drive means and also when the rotating tool spindle is being rotatably driven while the rotational phase $\theta$2 of the rotating tool spindle is being controlled by the rotating tool spindle drive means. In addition, the rotating tool spindle is fed while the position thereof is being controlled by the feed drive means in the biting and feed directions. Control signals used to control each of the main spindle, rotating tool spindle and feed drive means are provided from the numerical control means. By the use of the numerical control means for controlling the rotational phases of the workpiece and rotating tool spindle in synchronism with the biting movement of the rotating tool spindle such that the cutting tool is brought into contact with the inner or outer periphery of the workpiece with a given depth of cut during one complete revolution of the workpiece and for simultaneously controlling the feed of the rotating tool spindle, the workpiece can efficiently be machined with respect to the boring, contour forming, large-diameter threading or specific threading about any position different from the rotational center of the workpiece.

DETAILED DESCRIPTION OF THE PREFERRED EMBODIMENTS

Figure 3:
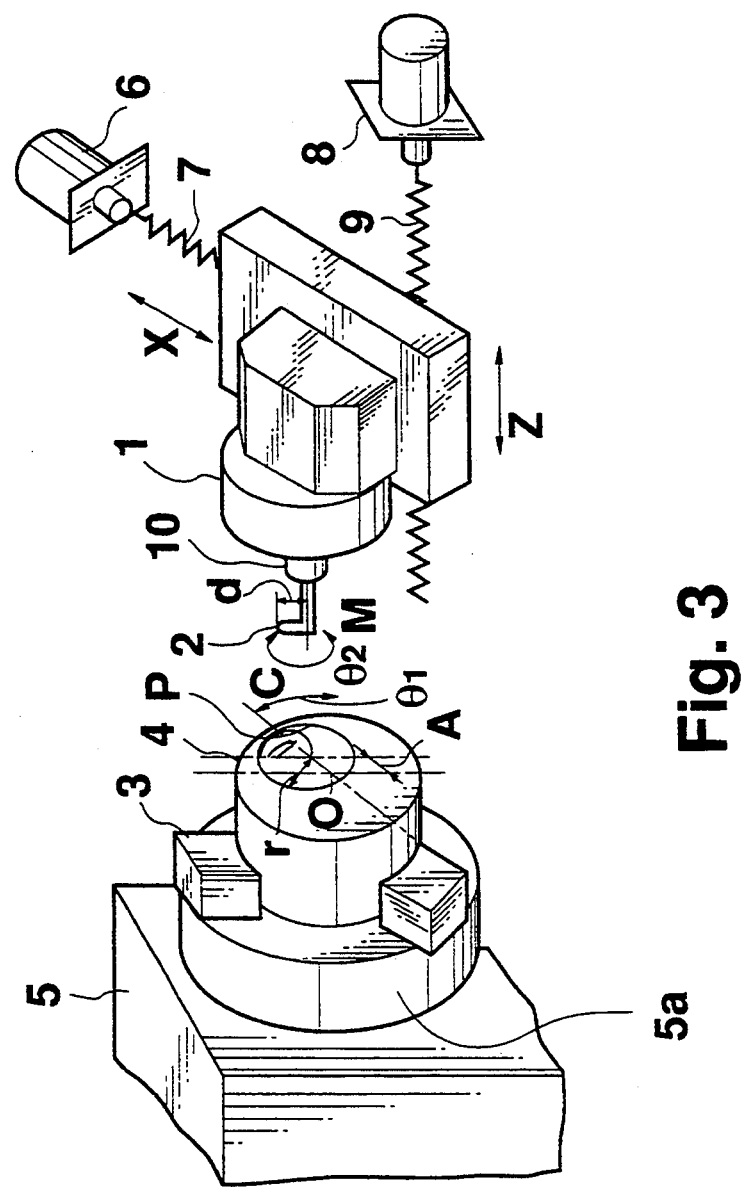
FIG. 3 is a perspective view of one embodiment of an eccentric-shape machining apparatus constructed in accordance with the present invention.

Referring to FIG. 3, there is shown the primary parts of one embodiment of an eccentric-shape machining apparatus constructed in accordance with the present invention. The eccentric-shape machining apparatus comprises a main spindle head 5 that is driven by a motor 11 (see FIG. 4). The main spindle head 5 includes a main spindle 5a on which a chuck 3 for holding a workpiece 4 is mounted. The apparatus also comprises a cutting head 1 movable relative to the main spindle head 5 in both the X- and Z-axis directions. The cutting head 1 rotatably supports a rotating tool spindle 10 for holding a cutting tool such as threading bit 2. The rotating tool spindle 10 is rotatably driven by a motor 12 (see FIG. 4). X- and Z-axis feed screws 7 and 9 are operatively mounted in the cutting head 1. The X-axis feed screw 7 is operatively connected to a X-axis feed motor 6 which is a cutting head feed drive. The Z-axis feed screw 9 is operatively connected to a Z-axis feed motor 8. As the X- and Z-axis feed motors 6 and 8 are energized, the cutting head 1 can be moved in both the X- and Z-axis directions. Thus, a cutting tool such as an end mill, drill or the like can be rotatably driven at a desired speed of revolution through the rotating tool spindle 10 to perform the conventional milling or drilling operation. Since the cutting head 1 is driven in both the X- and Z-axis directions perpendicular to each other while being controlled with respect to its position, the screw thread pitch is determined by performing the threading operation in the Z-axis feed.

Figure 1:
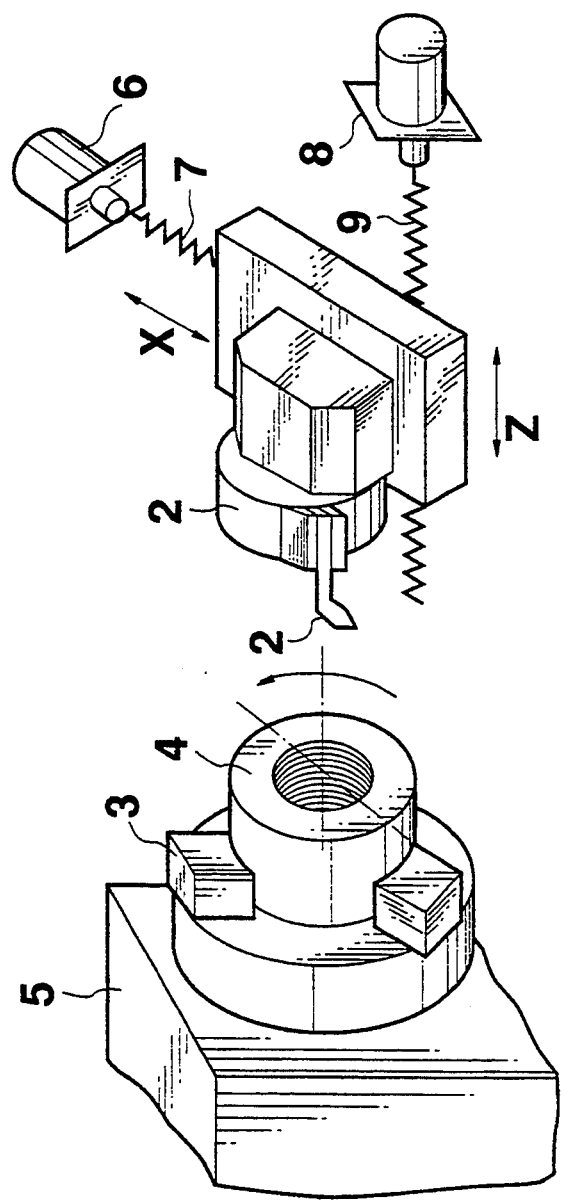
FIG. 1 is a perspective view of a threading apparatus constructed in accordance with the prior art.
Figure 2:
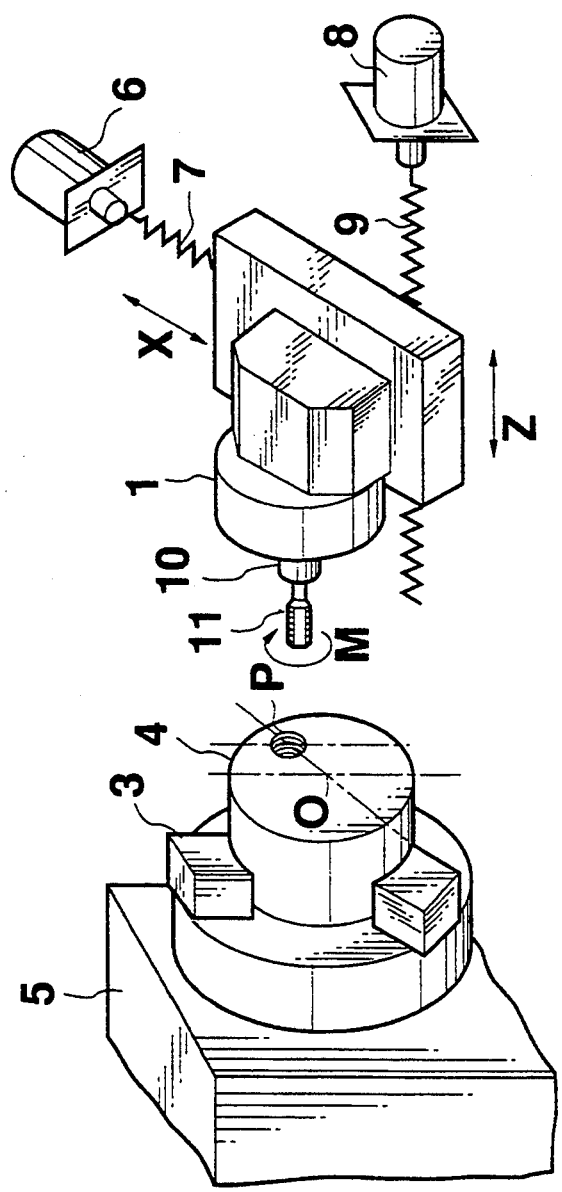
FIG. 2 is a perspective view of another threading apparatus constructed in accordance with the prior art.

The embodiment of FIG. 3 is characterized by that on threading, the workpiece and rotating tool spindle 4, 10 can rotatably be driven while their rotational phases ($\theta1$ and $\theta2$) are being controlled and also that the cutting bit 2 is mounted on the cutting head 1 in a direction perpendicular to the Z-axis direction, as schematically shown in FIG. 1.

Figure 4:
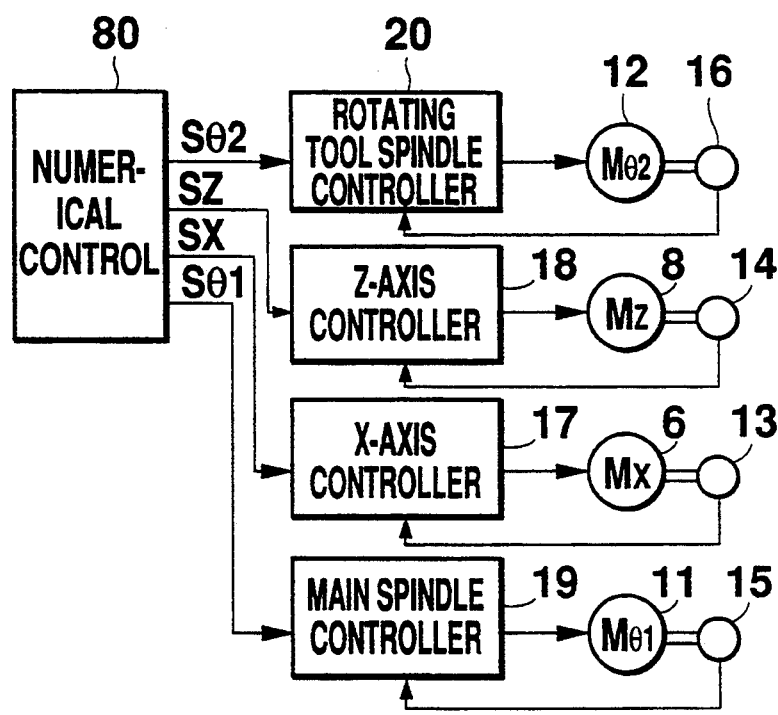
FIG. 4 is a block diagram of a synchronous control system for the eccentric-shape machining apparatus shown in FIG. 3.

Referring to FIG. 4, there is shown a control system usable in the eccentric-shape machining apparatus of FIG. 3. The control system includes a numerical control section 80 which synchronously controls the rotational phases of the rotating tool spindle and main spindle head 10, 5 and the biting direction (i.e. X-axis direction) of the cutting head 1 such that the threading bit 2 is brought into contact with the inner or outer periphery of the workpiece 4 by a given depth of cut during one complete revolution of the workpiece 4. Simultaneously, the numerical control section 80 controls the movement of the cutting head 1 in its feed or Z-axis direction by a given distance. The numerical control section 80 comprises a rotating tool spindle controller 20 for controlling the motor 12, a Z-axis feed controller 18 for controlling the Z-axis feed motor 8, an X-axis feed controller 17 for controlling the X-axis feed motor 6, and a main spindle controller 19 for controlling the motor 11. Each of the motors 6, 8, 11 and 12 is connected to a phase detector 13, 14, 15 or 16 in the form of a rotary encoder or the like for detecting the rotational phase. Each of the phase detectors 13, 14, 15 and 16 is connected to the corresponding one of the controllers 17, 18, 19 and 20. Thus, each of the controllers 17, 18, 19 and 20 can drivingly control the corresponding one of the motors 6, 8, 11 and 12 while always monitoring the phase of that motor. Therefore, the rotational phases of the workpiece and rotating tool spindle 4, 10 as well as the X- and Z-axis coordinates can be controlled by the control system.

The controllers 17, 18, 19 and 20 are synchronously controlled by shaft motion signals SX, SZ, S$\theta$1 and S$\theta$2 that are supplied by the numerical control section 80. While the rotating tool spindle 10 is controllably rotated through one complete revolution, therefore, the phase of the workpiece 4 and the X-axis position of the cutting head 1 can be controlled in synchronism with the rotation of the rotating tool spindle 10 such that the center of the rotating tool spindle 10 will be moved to draw a circular locus having a given diameter at a given location on the workpiece. Thus, the threading operation will be carried out at a cutting speed depending on a difference of speed between the threading bit 2 and the workpiece 4. As a result, the tip of the threading bit 2 can always be positioned perpendicular to the arc of thread as in the conventional threading operation. By controlling the rotational phases of the rotating tool spindle and workpiece 10, 4 and the X-axis motion of the cutting head 1 in combination, the threading bit 2 can be brought into contact with the inner or outer periphery of the workpiece 4 by a given depth of cut to machine large-diameter threads, variable pitch threads, tapered threads and the like, if desired.

Figure 5:
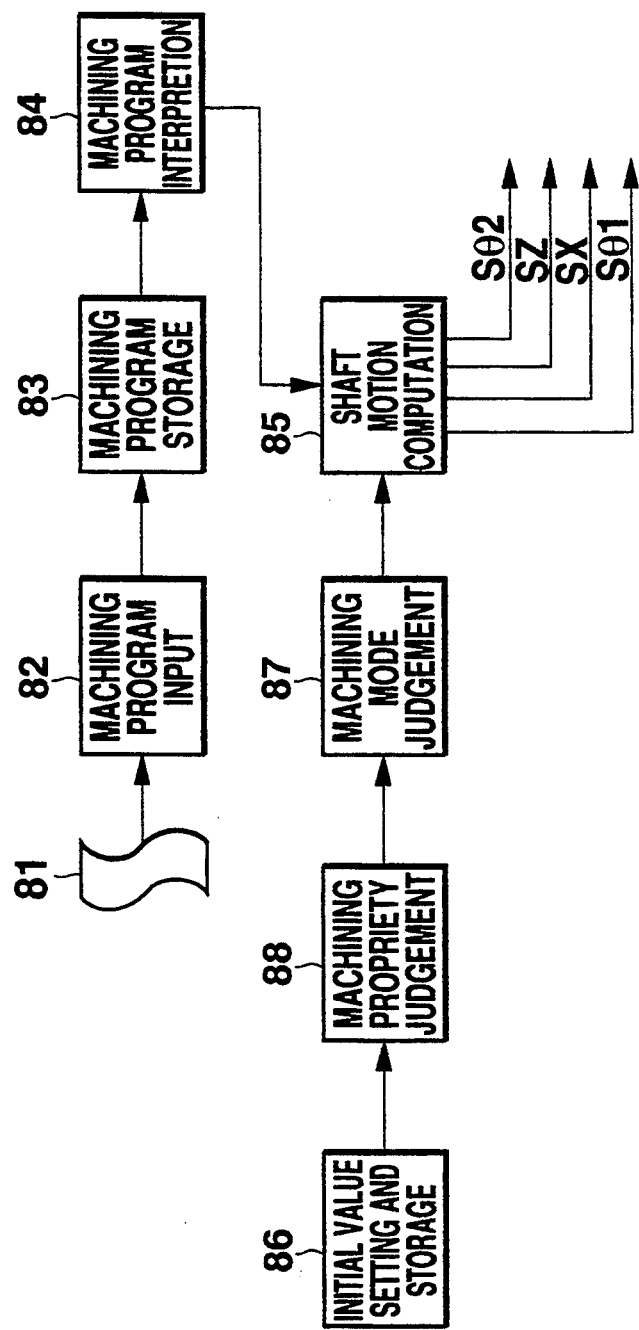
FIG. 5 is a block diagram of a numerical control section for the eccentric-shape machining apparatus shown in FIG. 3.

FIG. 5 is a block diagram showing the detailed arrangement of the numerical control section 80. The numerical control section 80 comprises a machining program input portion 82 for reading a paper tape 81 or the like on which a machining program has been recorded. The machining program input portion 82 is connected to a machining program storing portion 83 for storing the machining program read in. The machining program storing portion 83 is connected to a machining program interpreting portion 84 for reading out and interpreting the machining program stored in the machining program storing portion 83 for each block. The numerical control section 80 further includes an initial value setting and storing portion 86 for setting and storing initial values for tool data and the other data. The initial value setting and storing portion 86 is connected to a machining propriety judging portion 88 which in turn is connected to a machining mode judging portion 87. The machining mode judging portion and machining program interpreting portion 87, 84 are connected to a shaft motion computing portion 85 for taking in data from the initial value setting and storing portion 86 and also for computing shaft motion signals based on a machining mode theory formula in the machining mode judging portion 87.

In such a manner, the machining program recorded on the paper tape 81 or the like can be read in by the machining program input portion 82 and stored in the machining program storing portion 83. The stored machining program is then read out and interpreted by the machining program interpreting portion 84 for each block. Feed motion commands are then extracted from the machining program and fed to the shaft motion computing portion 85 wherein they are processed. The processed feed motion commands are used to determine a shaft motion signal SX, SZ, S$\theta$1 or S$\theta$2 for each rotating shaft, these determined signals being then fed to the controllers 17, 18, 19 and 20 for the motors 6, 8, 11 and 12, respectively.

The generation of a shaft motion signal for each shaft in the shaft motion computing portion 85 will now be described.

The X-axis position x and the rotational phase $\theta$1 can be represented by the following equations:

$$x = (r-d)\cos\theta 2 + A\cos\theta 1 \qquad 100$$

$$\theta 1 = \sin^{-1}[\{(r-d)\sin\theta 2\}/A] \qquad 101$$

where A is the distance between the rotational center O of the workpiece 4 and the center P of a hole to be machined 4a, r is the radius of the hole to be machined 4a, d is the turning radius of the threading bit 2 (the distance between the rotational center of the rotating tool spindle 10 and the tip of the bit), $\theta$1 is the rotational phase of the workpiece and $\theta$2 is the rotational phase of the threading bit.

In the above equations 100 and 101, the distance A and the radius r are provided by the machining program while the turning radius d is an initial value previously inputted depending on the type of tool used.

The Z-axis position z determining the pitch of the threads can be represented by the following equation:

$$z = (\theta 2/360°)p$$

where p is a specified pitch.

Figure 6:
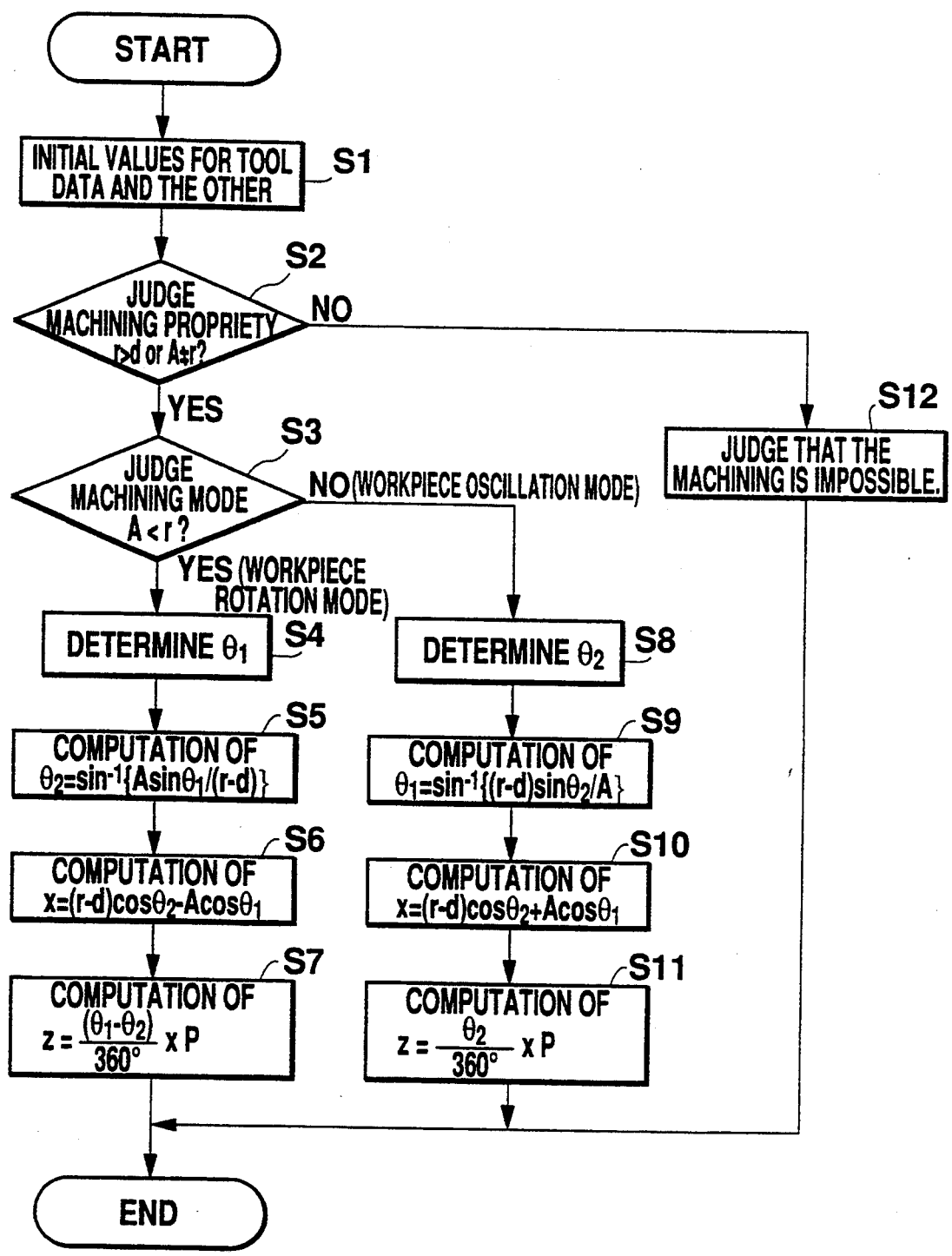
FIG. 6 is a flowchart illustrating a flow of operation in the eccentric-shape machining apparatus of FIG. 3.

The processing of shaft motion signals when a bore is machined will be described with reference to FIG. 6.

An operator determines initial values for tool data and others which in turn are stored in the initial value setting and storing portion 86 (step 1). The machining propriety judging portion 88 judges whether or not it is possible to machine a workpiece, that is, whether r>d or A≠r (step 2). If it is judged that machining is impossible (step 12), the program terminates. If it judged that machining is possible, the machining mode judging portion 87 determines a machining mode (workpiece rotation mode or workpiece oscillation mode) depending on whether or not A<r (step 3). If it is judged that the machining mode is the workpiece rotation mode, the value $\theta$1 is determined (step 4). Furthermore, the value $\theta$2 is computed by the following step (step 5):

$$\theta 2 = \sin^{-1}[A\sin\theta 1/(r-d)] \qquad 103$$

Subsequently, the value x is computed from the values r, d and $\theta$1 and the computed value $\theta$2 by the use of the following equation:

$$x = (r-d)\cos\theta 2 - A\cos\theta 1 \qquad 104$$

The program terminates after the value z is computed by the following equation:

$$z = \{(\theta 1 - \theta 2)/360°\}p \qquad 105$$

If it is judged at the step 3 that the machining mode is the workpiece oscillation mode, the value $\theta$2 is determined (step 8) and the value θ1 is computed from the equation 101 (step 9). Subsequently, the value x is computed from the equation 100 (step 10) and the value z is computed from the equation 102 (step 11). The program terminates.

Figure 7:
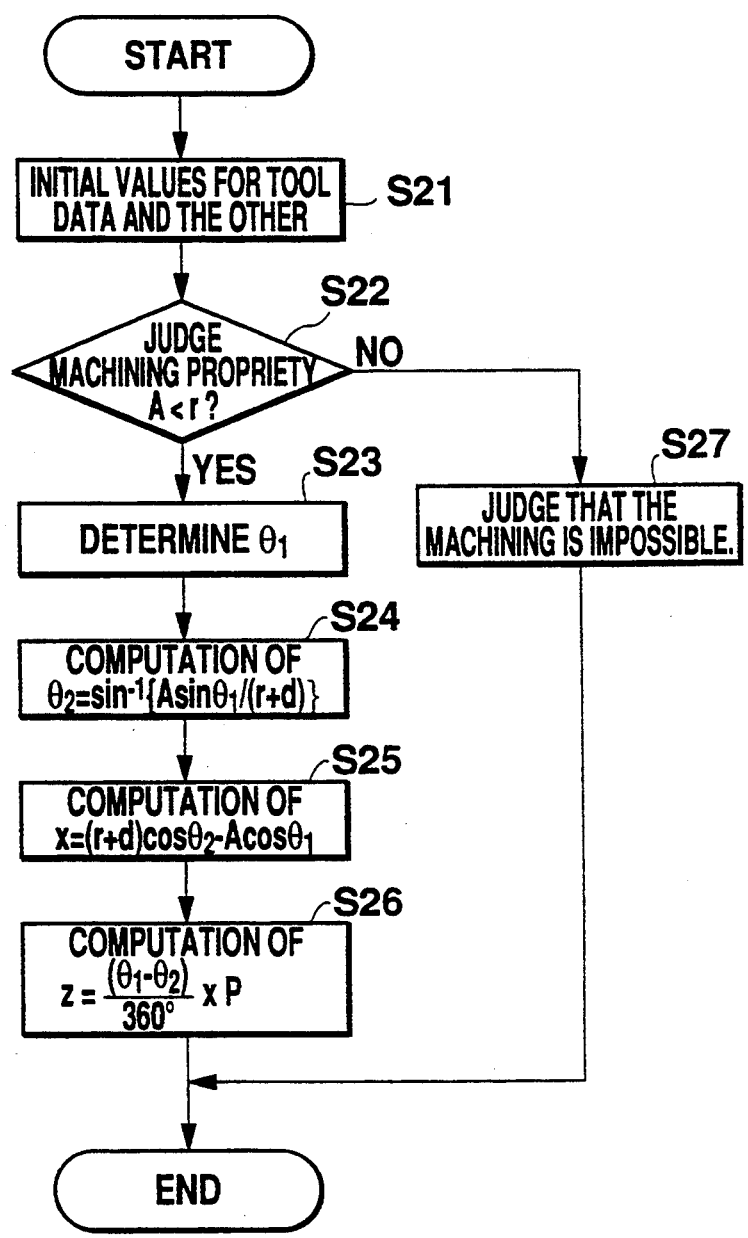
FIG. 7 is a flowchart illustrating another flow of operation in the eccentric-shape machining apparatus of FIG. 3.

The processing of shaft motion signals when the outline of a workpiece is machined will be described with reference to FIG. 7.

The operator determines initial values for tool data and others which in turn are stored in the initial value setting and storing portion 86 (step 21). It is then judged whether or not machining is possible, that is, whether or not A<r (step 22). If it is judged that the machining is impossible (step 27), the program terminates. If it is judged that the machining is possible, the value θ1 is determined (step 23). Further, the value 2 is computed from the equation 103 (step 24). The value x is calculated from the values r, d and θ1 and θ2 by the equation 104 (step 25). After the value z is computed by the equation 105 (step 26), the program terminates.

Figure 8:
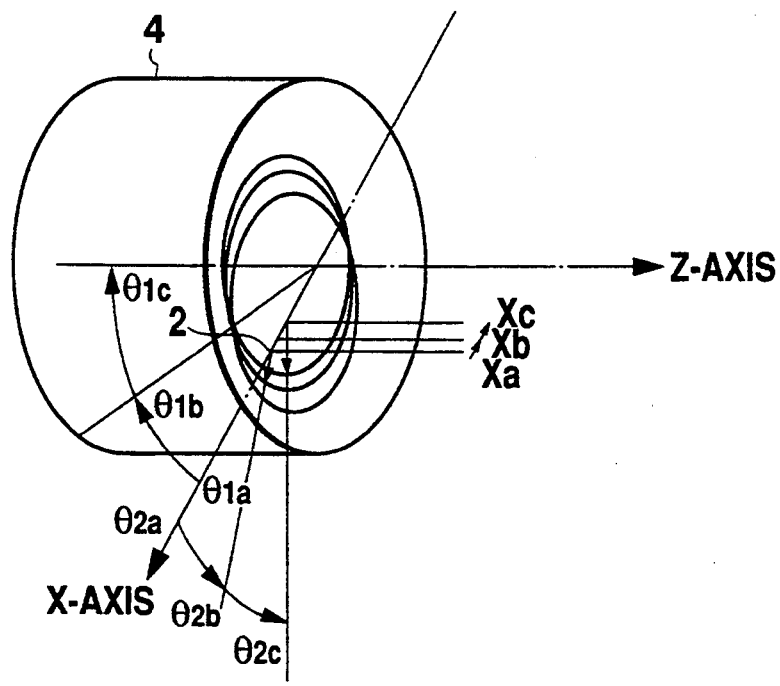
FIG. 8 is a diagram illustrating the operation of the eccentric-shape machining apparatus shown in FIG. 3.
Figure 9:
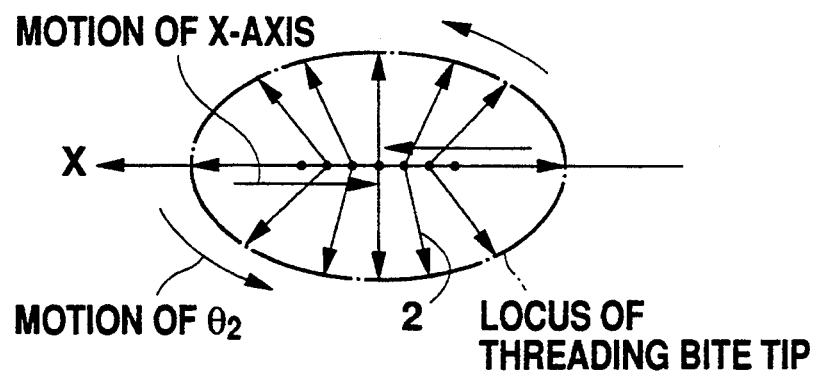
FIG. 9 is a diagram illustrating the operation of the eccentric-shape machining apparatus shown in FIG. 3.
Figure 10:
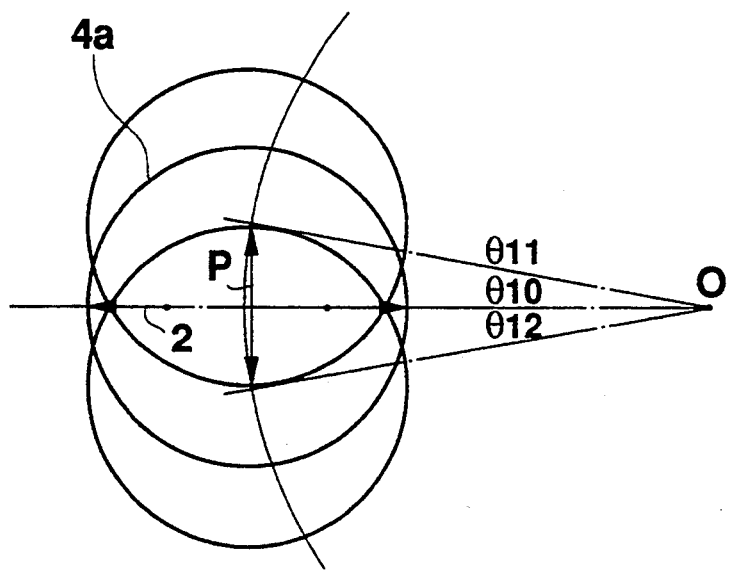
FIG. 10 is a diagram illustrating the operation of the eccentric-shape machining apparatus shown in FIG. 3.

If female threads are to be formed on the workpiece 4 in the workpiece oscillation mode, the rotational phase of the rotating tool spindle 10 controllably proceeds from θ2a through θ2b to θ2c while the rotational phase of the workpiece 4 proceeds from θ1a through θ1b to θ1c, as shown in FIG. 8. As a result, the X-axis position x of the cutting head 1 will move from xa through xb to xc. The position of the threading bit 2 relative to the X-axis varies through one complete revolution in such a manner as shown in FIG. 9. When the rotational phase θ2 of the threading bit 2 is in zero, 90 degrees, 180 degrees or 270 degrees, the position of a threaded bore 4a to be machined corresponding to the rotational phase of the threading bit 2 is shown in FIG. 10. The rotational phase of the workpiece 4 will be controlled to be θ10, θ11, θ10 or θ12 relative to the corresponding rotational phase θ2 of the threading bit 2. In other words, the rotational phase of the workpiece 4 will be reciprocated between θ11 and θ12.

Figure 11:
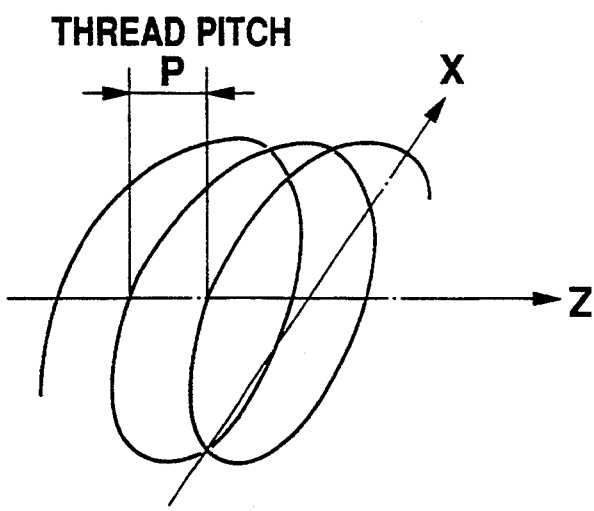
FIG. 11 is a diagram illustrating the operation of the eccentric-shape machining apparatus shown in FIG. 3.

FIG. 11 shows the relationship between the threading bit 2 and the cutting head through one complete revolution of the threading bit 2. As seen from FIG. 11, the cutting head 1 is fed in synchronism with the rotation of the threading bit 2 in the Z-axis direction by a given pitch p. This feed p has previously been set by the numerical control section 80. Therefore, when the synchronously positional relationship between the rotating tool spindle 10 and the workpiece 4 is controlled while controlling the feed pitch of the cutting head 1 in the Z-axis direction, threads having the desired large diameter, variable pitch threads, specific threads such as tapered threads and the like can be machined in the workpiece. If the feed in the Z-axis direction is used as a given thread pitch, the bore can be machined in the workpiece.

The machining in the workpiece rotation mode will be described with reference to FIGS. 12 through 29.

Figure 12:
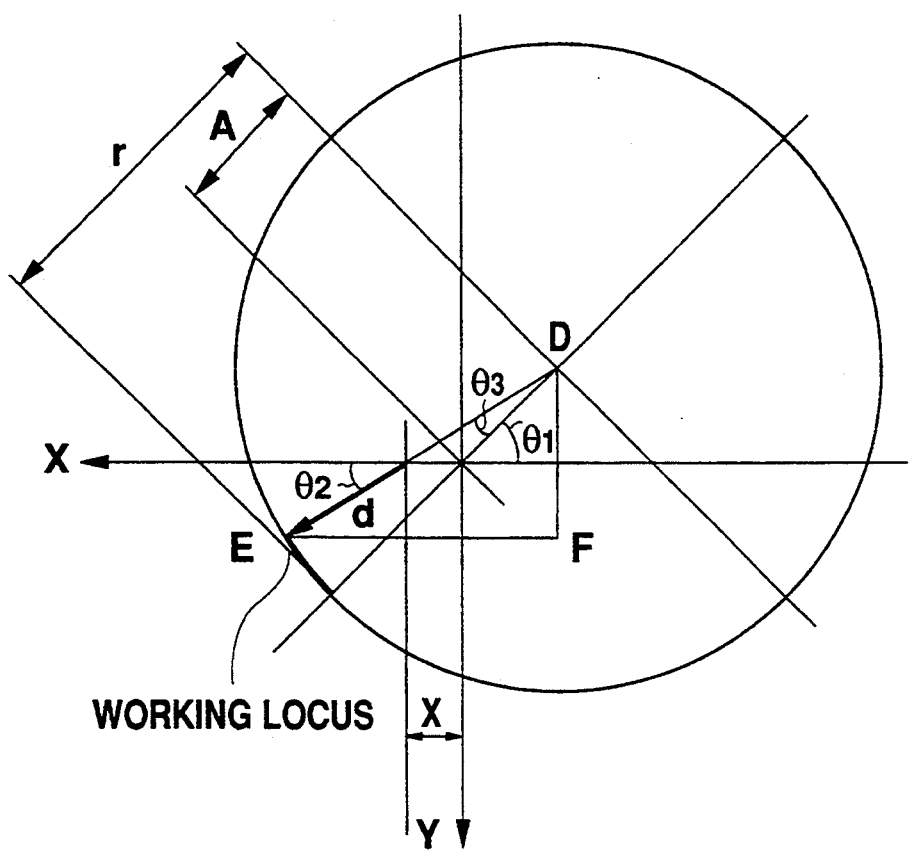
FIG. 12 is a diagram illustrating the operation of the eccentric-shape machining apparatus shown in FIG. 3.
Figure 13:
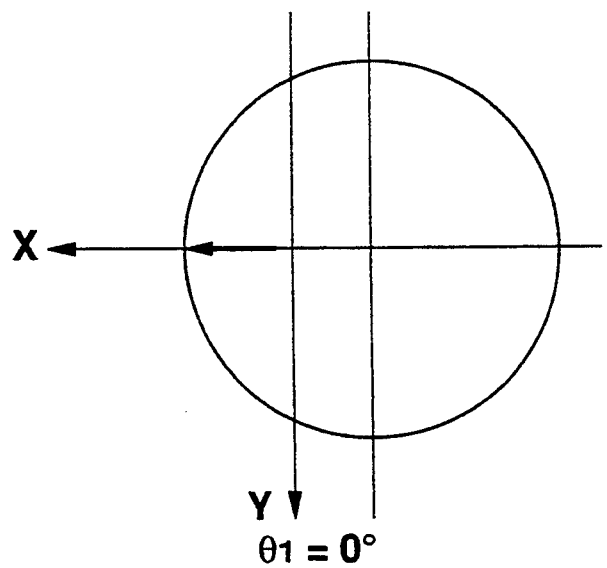
FIG. 13 is a diagram illustrating the operation of the eccentric-shape machining apparatus shown in FIG. 3.
Figure 14:
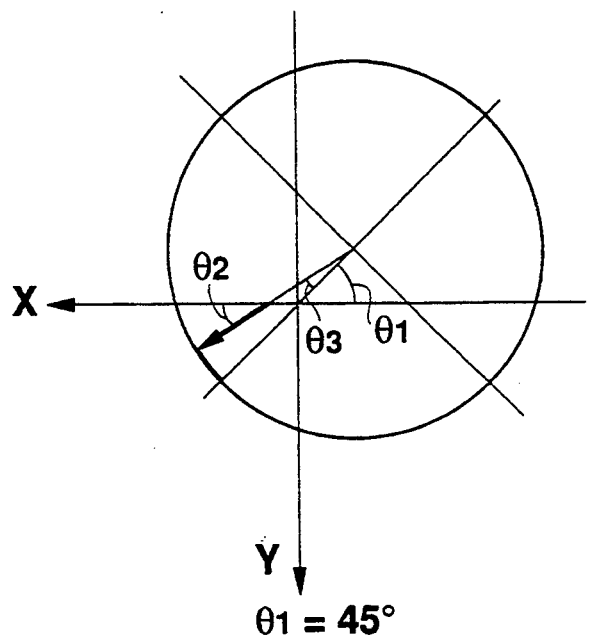
FIG. 14 is a diagram illustrating the operation of the eccentric-shape machining apparatus shown in FIG. 3.
Figure 15:
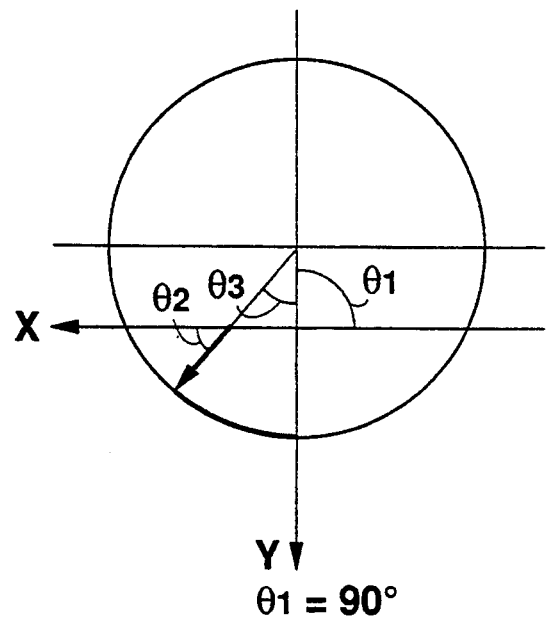
FIG. 15 is a diagram illustrating the operation of the eccentric-shape machining apparatus shown in FIG. 3.
Figure 16:
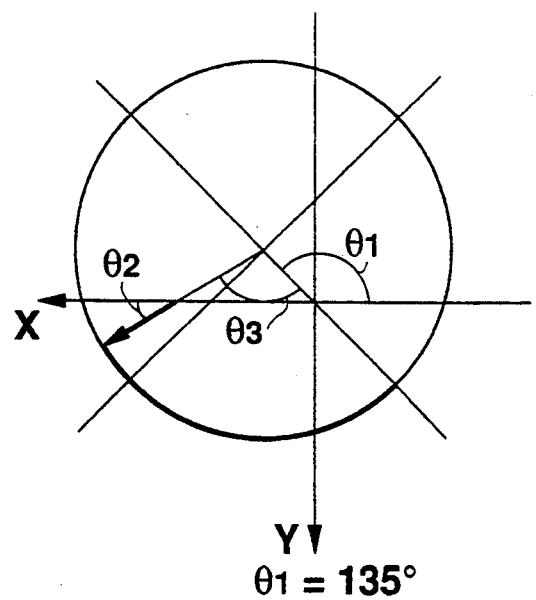
FIG. 16 is a diagram illustrating the operation of the eccentric-shape machining apparatus shown in FIG. 3.
Figure 17:
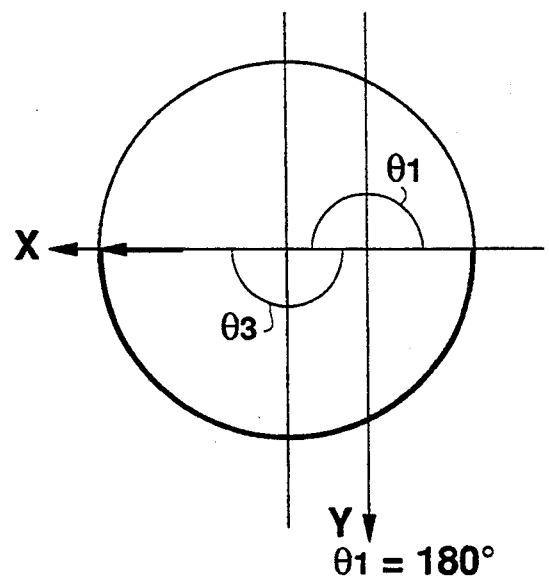
FIG. 17 is a diagram illustrating the operation of the eccentric-shape machining apparatus shown in FIG. 3.
Figure 18:
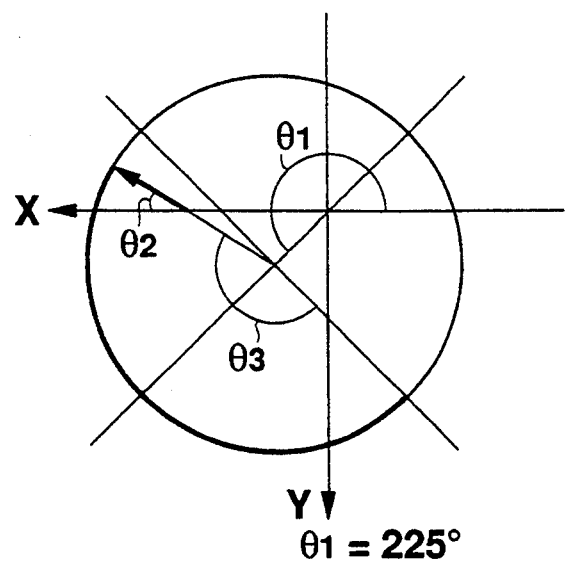
FIG. 18 is a diagram illustrating the operation of the eccentric-shape machining apparatus shown in FIG. 3.
Figure 19:
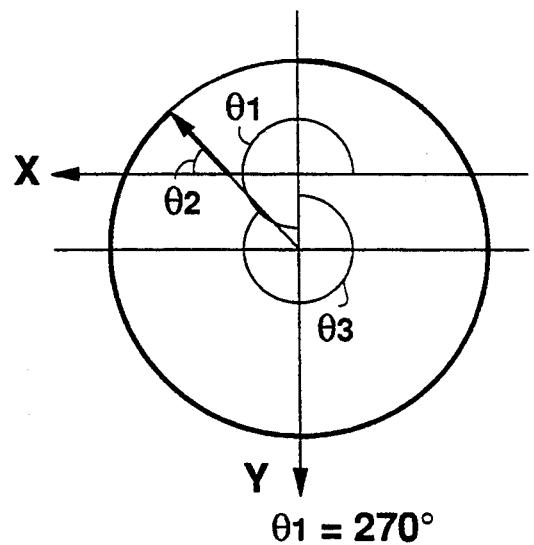
FIG. 19 is a diagram illustrating the operation of the eccentric-shape machining apparatus shown in FIG. 3.
Figure 20:
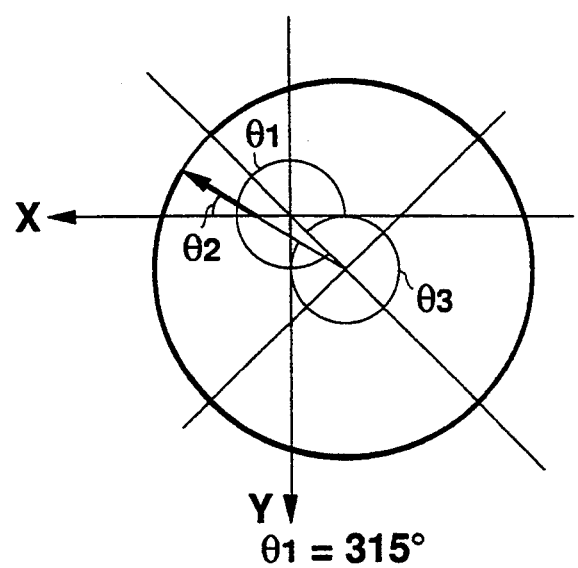
FIG. 20 is a diagram illustrating the operation of the eccentric-shape machining apparatus shown in FIG. 3.

FIG. 12 shows the geometrical relationship between a workpiece to be bored and a tool or other component. The following equations can be derived from the relationship between the sides of a triangle DEF in the X- and Y-axis directions:

$$x = EF - (d\cos\theta2 + A\cos\theta1)$$
$$= r\cos\theta2 - (d\cos\theta2 + A\cos\theta1)$$
$$= (r - d)\cos\theta2 - A\cos\theta1$$

$$DF = r\sin\theta2 = d\sin\theta2 + A\sin\theta1$$

-continued
$$(r - d)\sin\theta2 = A\sin\theta1$$
$$\theta2 = \sin^{-1}\{A\sin\theta1/(r - d)\}$$
$$\theta3 = 180 - \{\theta2 + (180° - \theta1)\}$$
$$= \theta1 - \theta2$$

$$z = (\theta3/360°)p$$
$$= \{(\theta1 - \theta2)/360°\}p$$

where p represents a pitch in the case of threading and a feed in the case of boring. Therefore, the computation of shaft motion signals in the shaft motion computing portion 85 will be carried out according to such a procedure as shown by steps 4–7 in FIG. 6.

Figure 21:
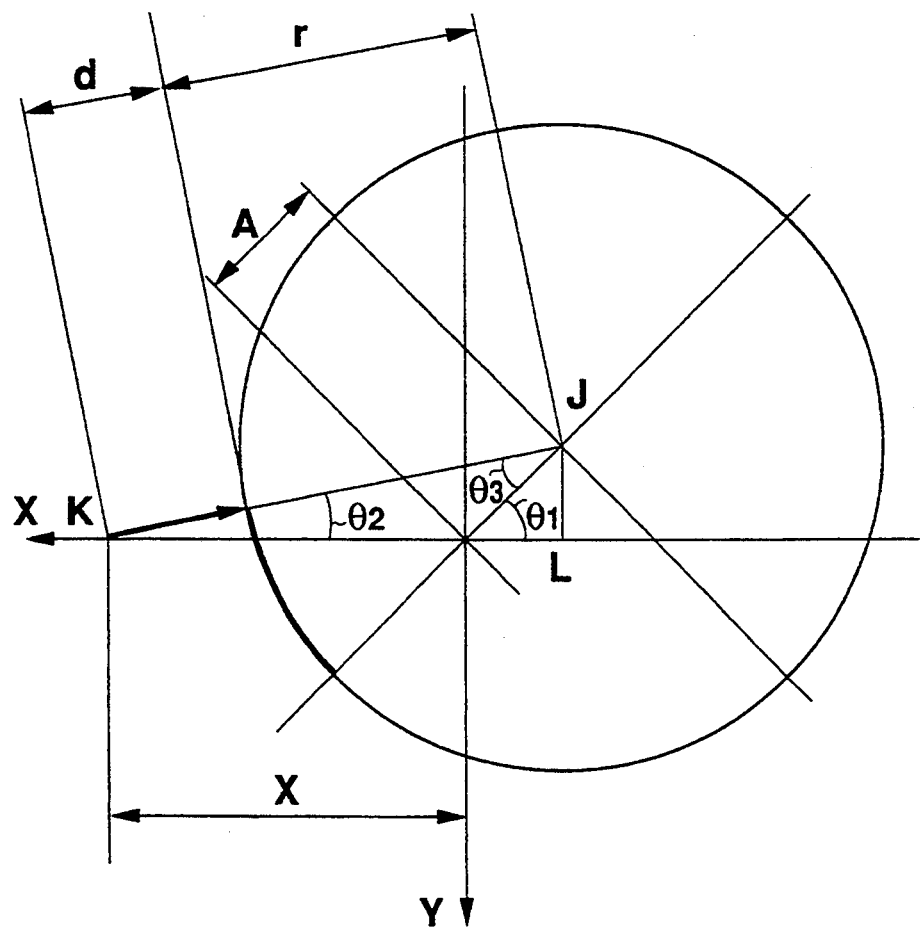
FIG. 21 is a diagram illustrating the operation of the eccentric-shape machining apparatus shown in FIG. 3.
Figure 22:
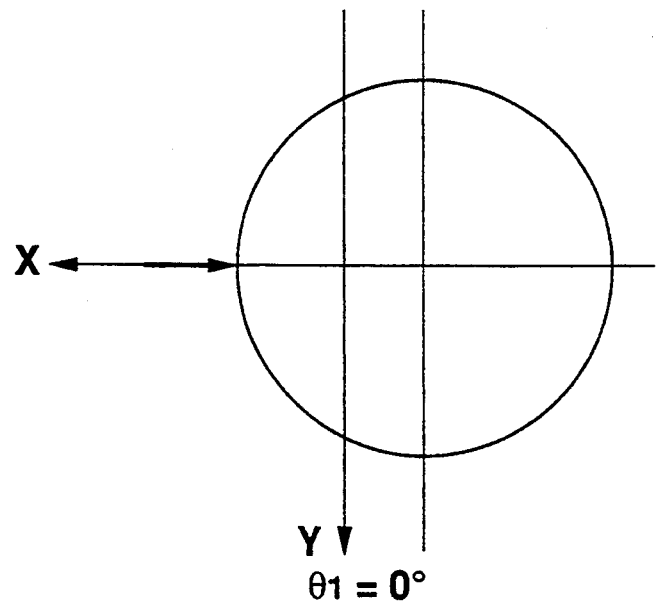
FIG. 22 is a diagram illustrating the operation of the eccentric-shape machining apparatus shown in FIG. 3.
Figure 23:
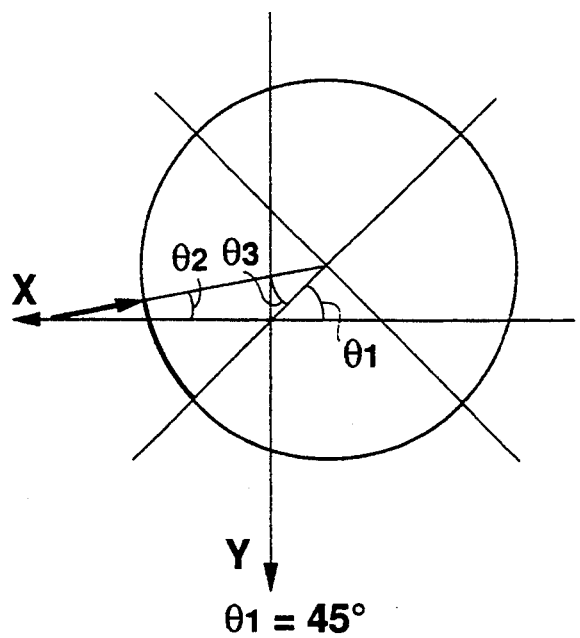
FIG. 23 is a diagram illustrating the operation of the eccentric-shape machining apparatus shown in FIG. 3.
Figure 24:
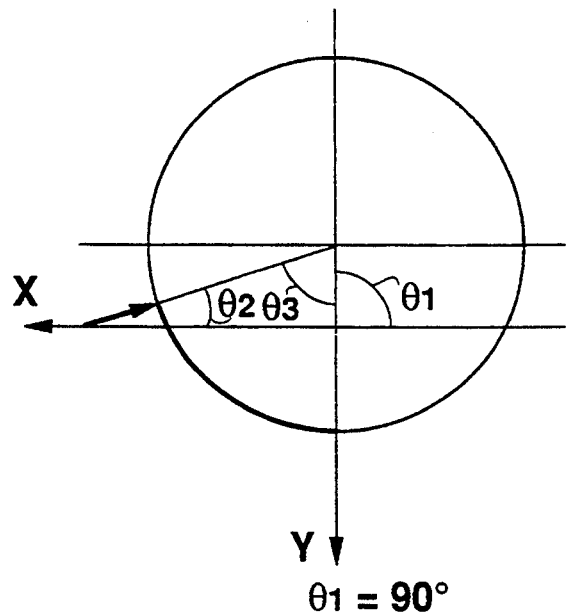
FIG. 24 is a diagram illustrating the operation of the eccentric-shape machining apparatus shown in FIG. 3.
Figure 25:
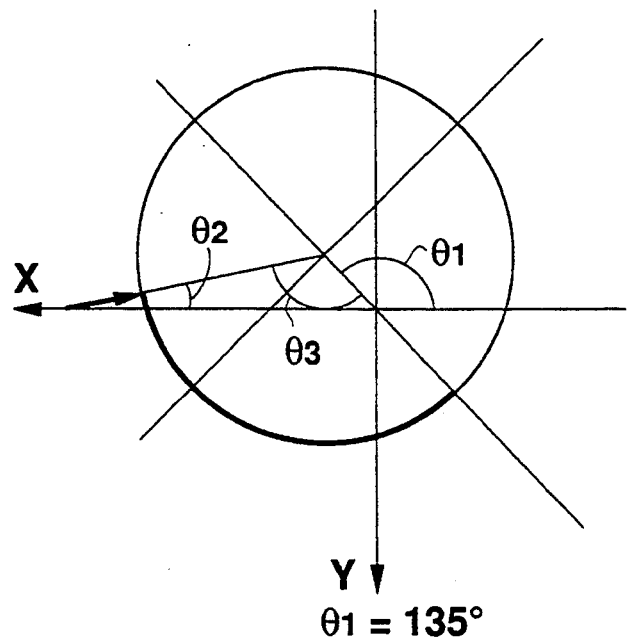
FIG. 25 is a diagram illustrating the operation of the eccentric-shape machining apparatus shown in FIG. 3.
Figure 26:
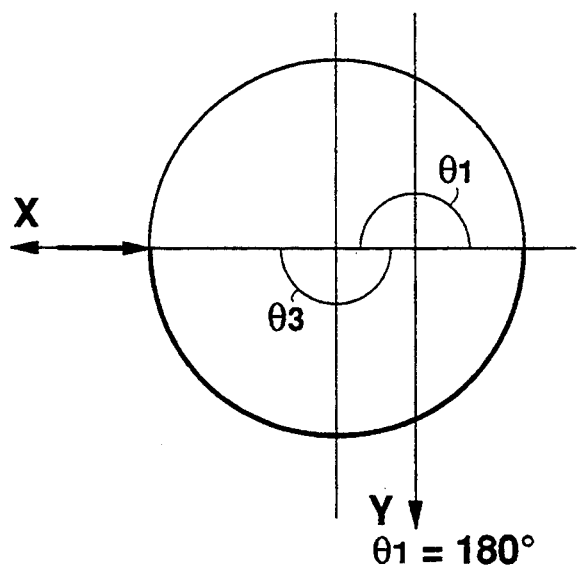
FIG. 26 is a diagram illustrating the operation of the eccentric-shape machining apparatus shown in FIG. 3.
Figure 27:
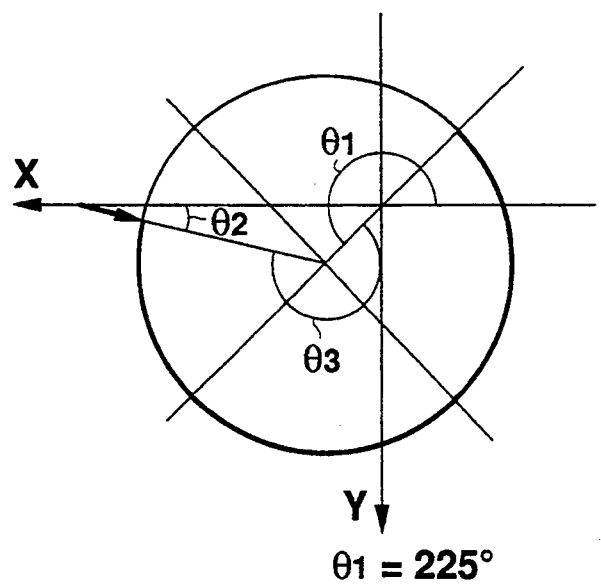
FIG. 27 is a diagram illustrating the operation of the eccentric-shape machining apparatus shown in FIG. 3.
Figure 28:
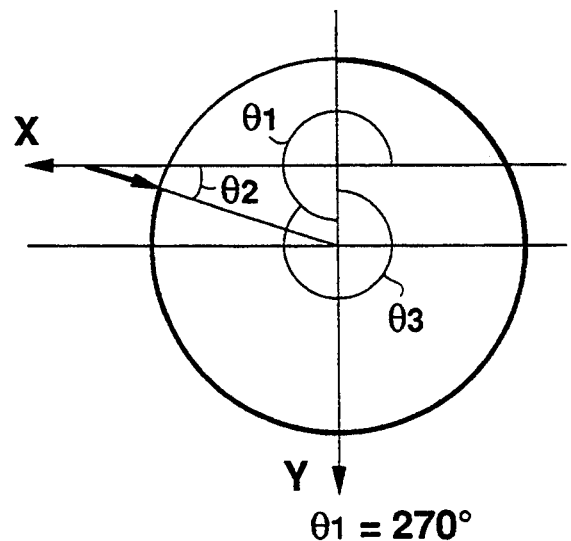
FIG. 28 is a diagram illustrating the operation of the eccentric-shape machining apparatus shown in FIG. 3.
Figure 29:
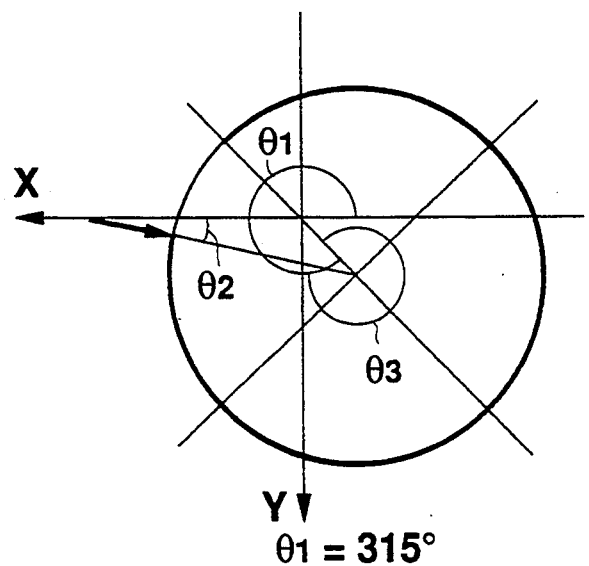
FIG. 29 is a diagram illustrating the operation of the eccentric-shape machining apparatus shown in FIG. 3.

FIGS. 13 to 20 illustrate the boring operation in which the position and working locus of the bit are changed depending on changes in the rotational phase θ1 of the workpiece. FIG. 21 shows the geometrical relationship between a workpiece to be contoured and a tool or other component. The following equations can be derived from the relationship between the sides of a triangle JKL in the X- and Y-axis directions:

$$x = KL - A\cos\theta1$$
$$= (r + d)\cos\theta2 - A\cos\theta1$$
$$JL = A\sin\theta1 = d\sin\theta2 + r\sin\theta2$$
$$(r + d)\sin\theta2 = A\sin\theta1$$
$$\theta2 = \sin^{-1}\{A\sin\theta1/(r + d)\}$$
$$\theta3 = 180 - \{\theta2 + (180° - \theta1)\}$$
$$= \theta1 - \theta2$$
$$z = (\theta3/360°)p$$
$$= \{(\theta1 - \theta2)/360°\}p$$

where p represents a pitch in the case of threading and a feed in the case of contouring. Therefore, the computation of shaft motion signals in the shaft motion computing portion 85 will be carried out according to such a procedure as shown by steps 23 to 26 in FIG. 7. FIGS. 22 to 29 show the operation of machining the contour of a workpiece and illustrate that the position and working locus of the bit are changed depending on changes in the rotational phase θ1 of the workpiece.

Figure 30:
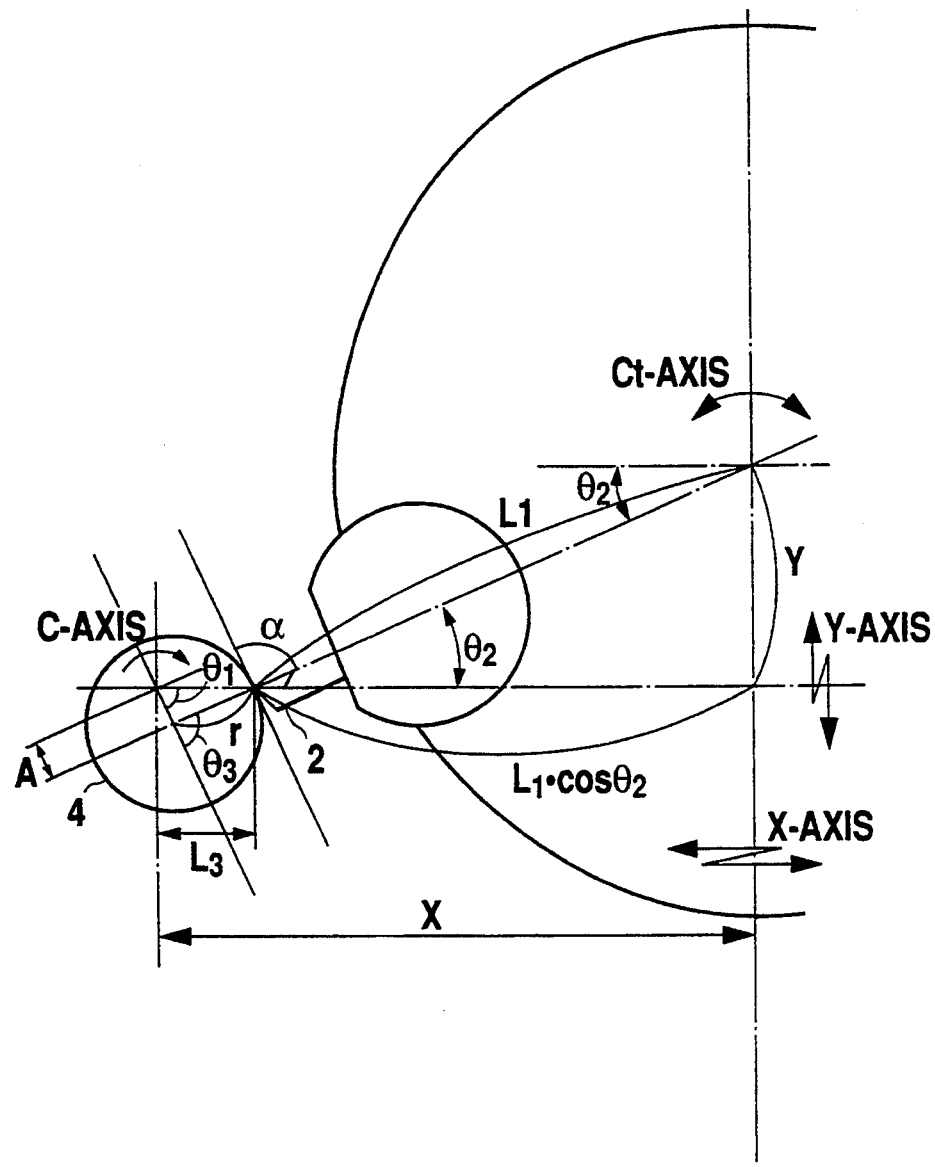
FIG. 30 is a diagram illustrating the operation of another embodiment of an eccentric-shape machining apparatus constructed in accordance with the present invention.
Figure 31:
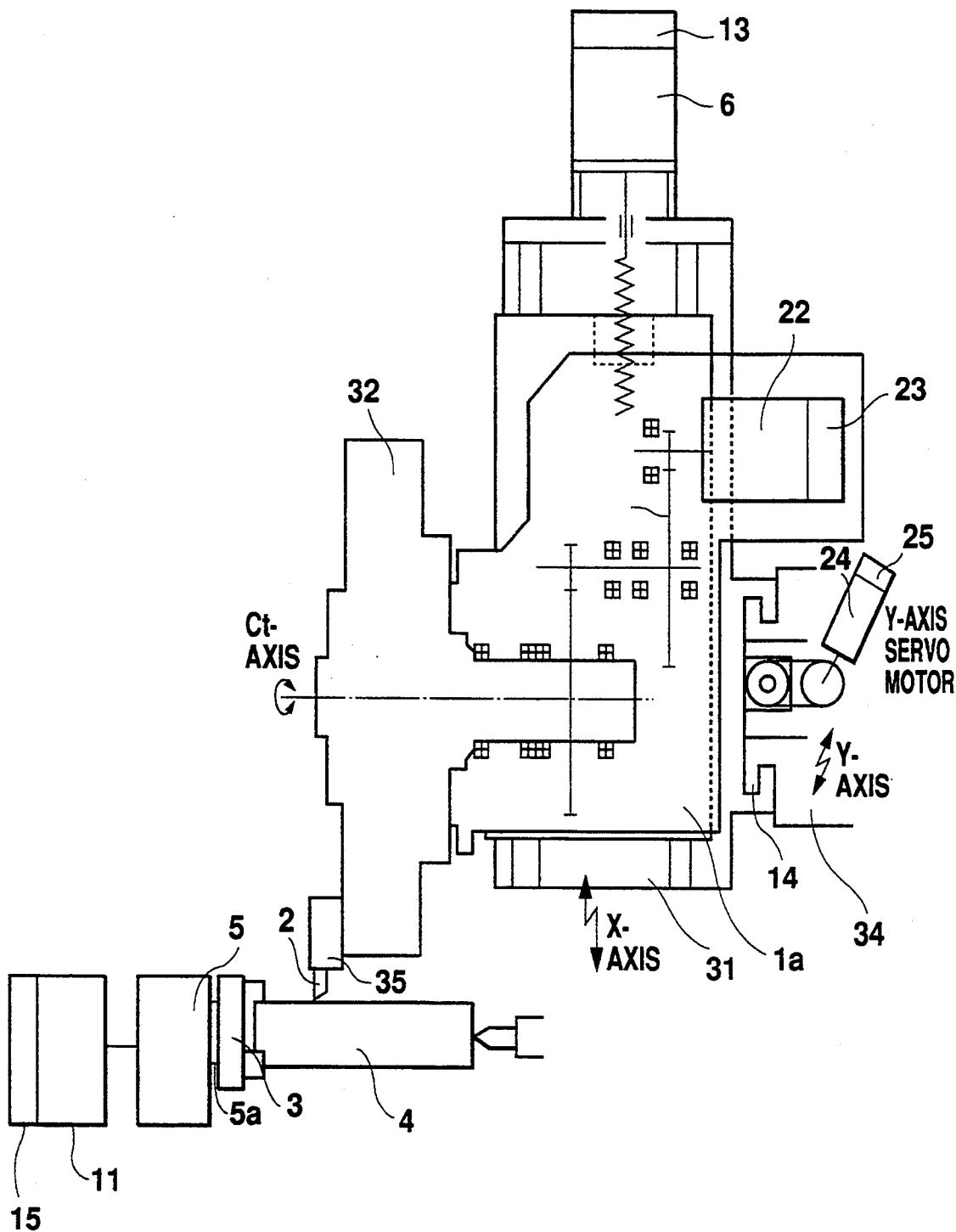
FIG. 31 is a schematic view of the arrangement of still another embodiment of an eccentric-shape machining apparatus constructed in accordance with the present invention.
Figure 32:
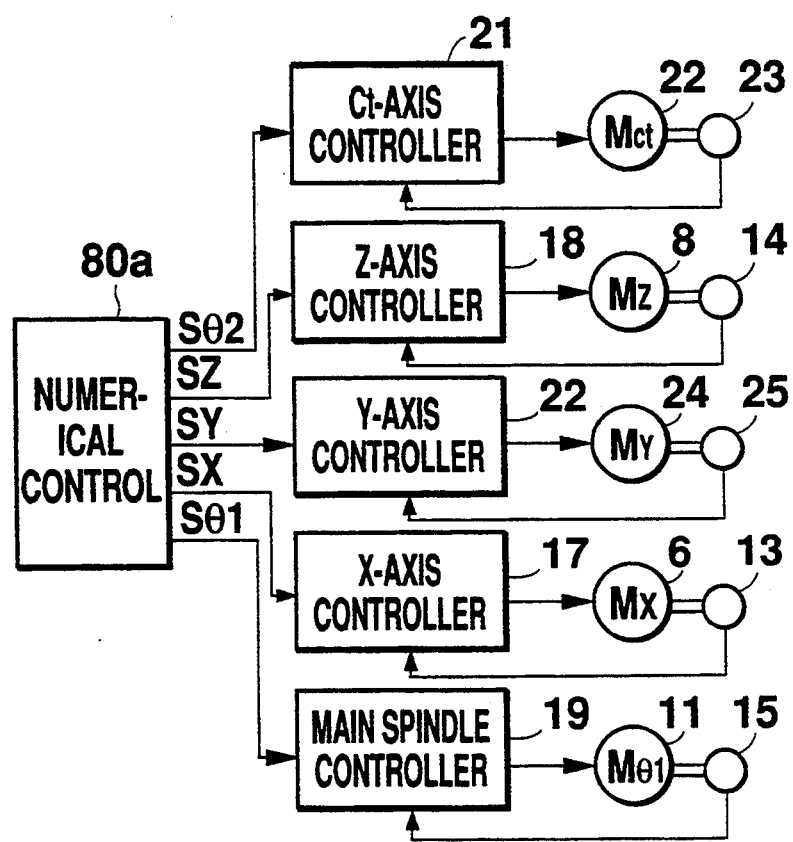
FIG. 32 is a block diagram of a synchronous control system for the eccentric-shape machining apparatus shown in FIG. 31.

FIGS. 30 to 32 show another embodiment of an eccentric-shape machining apparatus constructed in accordance with the present invention. The eccentric-shape machining apparatus comprises a main spindle head 5 on which a main spindle 5a supporting a chuck 3 is mounted. The main spindle 5a is controllably rotated about the C-axis by a motor 11 through a main spindle controller 19. The eccentric-shape machining apparatus also comprises a slide 34 which is controllably movable on a bed (not shown) in the Z-axis direction parallel to the main spindle 5a. The slide can be positioned in place in the Z-axis direction by a motor 8 having an encoder 14 through a Z-axis feed controller 18.

The eccentric-shape machining apparatus further comprises an intermediate head 31 which is controllably movable relative to the slide 34 in the Y-axis direction by a motor 24 having an encoder 25 through a Y-axis controller 22. The intermediate head 31 includes a cutting head 1a which is controllably movable in the X-axis direction by a motor 6 having an encoder 13 through an X-axis controller 17. The cutting head 1a includes a turret 32 which is controllably rotatable about the Ct-axis. The rotation of the turret 32 is controlled by a motor 22 having an encoder 23 through a Ct-axis controller 21. A bit 2 is fixedly mounted on the turret 32 through a tool holder 35 to extend in a direction perpendicular to the axis of the turret. The bit 2 will machine a workpiece 4 held by the chuck 3. All the above controllers 19, 18, 22, 17 and 21 are controlled by a numerical control section 80.

In this embodiment, thus, the cutting tip of the tool can be positioned on the X-axis through a composite motion that is produced by simultaneously controlling the C-axis for the control of the rotational phase in the workpiece, the X-axis extending in the direction perpendicular to the main spindle of the cutting head 1a, the Y-axis extending perpendicular to the C- and X-axes and the Ct-axis parallel to the C-axis. At the same time, the cutting operation can be controlled such that the rake angle $\alpha$ of the threading bit 2 is maintained at a given angle (e.g. 90 degrees) relative to a tangent line at a cutting point on the cutting plane. Since the rake angle $\alpha$ of the threading bit 2 is maintained constant, the flow of shavings can be smoothly controlled without disturbance in the cutting plane. In such a case, initial values for the tool and other components are set to determine the value $\theta 1$. Thereafter, the value $\theta 3$ is computed by the following equations:

$$\theta 3 = \theta 1 + \theta 2$$

$$A\sin\theta 1 = r\sin(\theta 3 - \theta 1)$$

Thus, $$\theta 3 = \theta 1 + \sin^{-1}(A\sin\theta 1 / r)$$

Subsequently, the value $\theta 2$ is determined and the value X is computed by the following equation:

$$X = L3 + L1\cos\theta 2$$
$$= A\cos\theta 1 + r\cos(\theta 3 - \theta 1) + L1\cos\theta 2$$

Further, the value Y is computed by the following equation:

$$Y = L1\sin\theta 2$$

The value Z is then computed from the following equation:

$$Z = (\theta 3 / 360°) p$$

Figure 33:
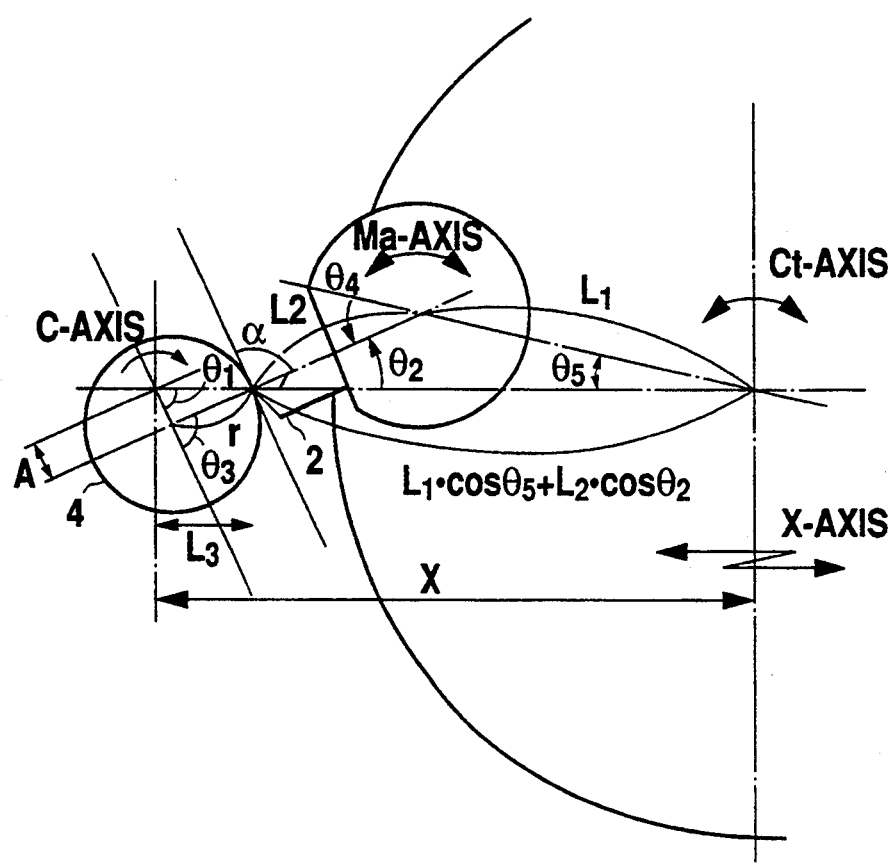
FIG. 33 is a diagram illustrating the operation of a further embodiment of an eccentric-shape machining apparatus constructed in accordance with the present invention.
Figure 34:
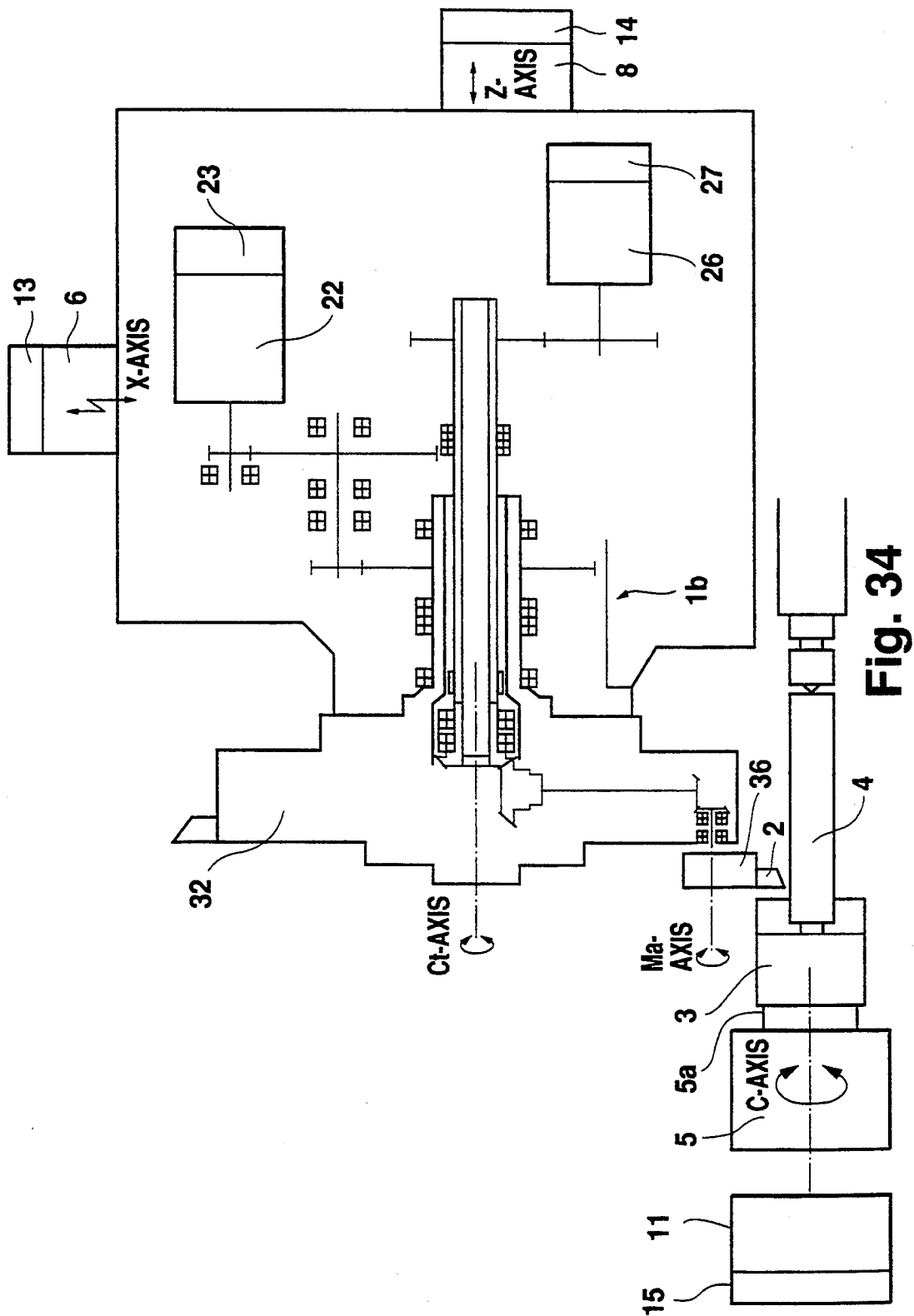
FIG. 34 is a schematic diagram illustrating the arrangement of a further embodiment of an eccentric-shape machining apparatus constructed in accordance with the present invention.
Figure 35:
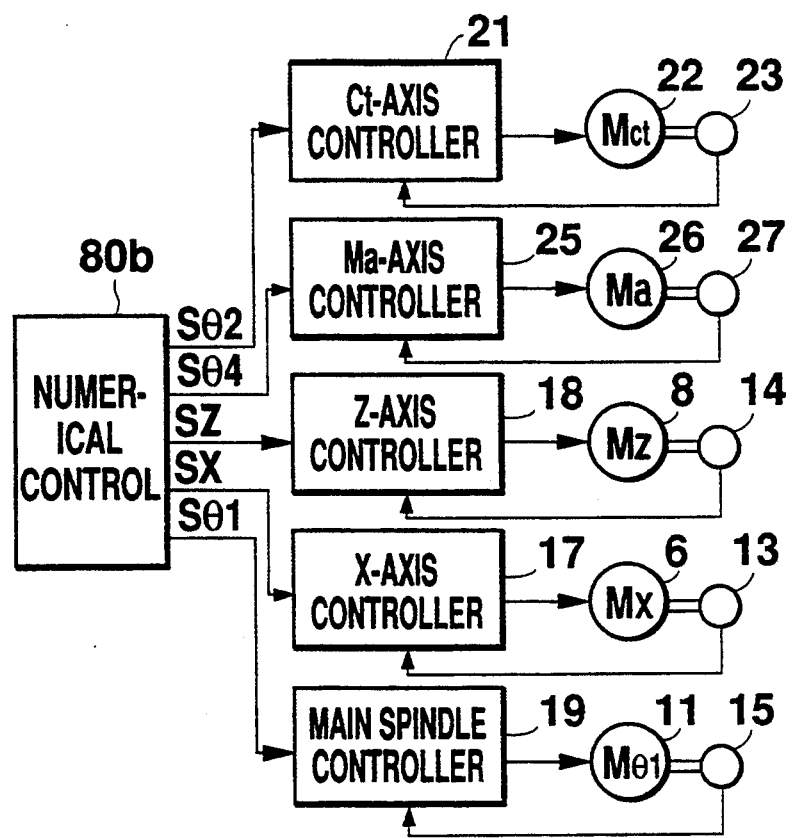
FIG. 35 is a block diagram of the synchronous control system for the eccentric-shape machining apparatus shown in FIG. 34.

FIGS. 33 to 35 show still another embodiment of an eccentric-shape machining apparatus constructed in accordance with the present invention. The eccentric-shape machining apparatus comprises a main spindle head 5 on which a main spindle 5a supporting a chuck 3 is mounted. The main spindle 5a is controllably rotated about the C-axis by a motor 11 having an encoder 15 through a main spindle controller 19.

The eccentric-shape machining apparatus also comprises a cutting head 1b which is controllably movable by a motor 6 having an encoder 13 through an X-axis controller 17 in the X-axis direction and also by a motor 8 having an encoder 14 through a Z-axis controller 18 in the Z-axis direction, as shown in FIGS. 34 and 35.

The cutting head 1b includes a turret 32 which is controllably rotatable about the Ct-axis extending parallel to the C-axis. The rotation of the turret 32 is controlled by a motor 22 having an encoder 23 through a Ct-axis controller 21. The turret 32 includes a rotating tool spindle 36 which is controllably rotatable about an Ma-axis parallel to the Ct-axis. The rotation of the rotating tool spindle 36 is controlled by a motor 26 having an encoder 27 through an Ma-axis controller 25. A bit 2 is fixedly mounted on the rotating tool spindle 36 in a direction perpendicular to the axis of the turret. The bit 2 will machine a workpiece 4 held by the chuck 3. All the above controllers 19, 18, 17, 21 and 25 are controlled by a numerical control section 80.

In this embodiment, thus, the cutting tip of the tool can be positioned on the X-axis through a composite motion that is produced by simultaneously controlling the C-axis for the control of the rotational phase in the workpiece, the X-axis extending in the direction perpendicular to the main spindle of the cutting head 1a, the Ct-axis parallel to the C-axis and the Ma-axis extending parallel to the Ct-axis and used to control the rotating tool spindle. At the same time, the cutting operation can be controlled such that the rake angle $\alpha$ of the threading bit 2 is maintained at a given angle (e.g. 90 degrees) relative to a tangent line at a cutting point on the cutting plane. Since the rake angle $\alpha$ of the threading bit 2 is maintained constant, the flow of shavings can smoothly controlled without disturbance in the cutting plane. In such a case, initial values for the tool and other components are set to determine the value $\theta 1$. Thereafter, the value $\theta 3$ is computed by the following equations:

$$\theta 3 = \theta 1 + \theta 2$$

$$A\sin\theta 1 = r\sin(\theta 3 - \theta 1)$$

Thus, $$\theta 3 = \theta 1 + \sin^{-1}(A\sin\theta 1 / r)$$

The value $\theta 2$ is then determined and the value $\theta 5$ is computed by the following equations:

$$\theta 4 = \theta 2 + \theta 5$$

$$L2\sin\theta 2 = L1\sin\theta 5$$

Thus, $$\theta 5 = \sin^{-1}(L2\sin\theta 2 / L1)$$

Further, the $\theta 4$ is computed from the above equations and the value X is computed by the following equation:

$$X = L3 + L1\cos\theta 5 + L2\cos\theta 2$$
$$= A\cos\theta 1 + r\cos(\theta 3 - \theta 1) + L1\cos\theta 5 + L2\cos\theta 2$$

And, the value Z is computed by the following equation:

$$Z = (\theta 3 / 360°) p$$

As will be apparent from the above description, the eccentric-shape machining apparatus of the present invention can efficiently and accurately machine a workpiece about any position other than the rotational center of the workpiece by the use of any conventional and inexpensive tool without need of any specific tool to form a bore, contour, large-diameter threads or specific threads.

We claim:

1. An eccentric-shape machining apparatus for machining a workpiece, including boring, contour shaping, threading and so on, about a position different from the rotational center of the workpiece, said apparatus comprising:

(1) a main spindle on which a chuck for holding the workpiece is mounted;

(2) a rotating tool spindle on which a cutting tool can be mounted in a direction perpendicular to the axis of the cutting tool;

(3) main spindle drive means for rotatably driving the main spindle while controlling the rotational phase ($\theta 1$) of the workpiece;

(4) rotating tool spindle drive means for rotatably driving the rotating tool spindle while controlling the rotational phase ($\theta 2$) of the rotating tool spindle;

(5) feed drive means for feeding the rotating tool spindle relative to the workpiece in a biting direction (X-axis direction) and in a feed direction (Z-axis direction) while controlling the position of the rotating tool spindle; and (6) numerical control means for controlling the rotational phases of the workpiece and rotating tool spindle in synchronism with the biting movement of the rotating tool spindle such that the cutting tool is brought into contact with the inner or outer periphery of the workpiece with a given depth of cut during one complete revolution of the workpiece and for simultaneously controlling the feed of the rotating tool spindle, wherein said numerical control means includes a machining mode judging portion for judging that the eccentric-shape machining mode is a workpiece oscillation mode if the eccentricity is larger than the machining radius and for judging that the eccentric-shape machining mode is a workpiece rotation mode if the eccentricity is not larger than the machining radius.

2. An eccentric-shape machining apparatus as defined in claim 1 wherein said numerical control means further includes:

(1) a machining program input portion;

(2) a machining program storing portion;

(3) a machining program interpreting portion for reading and interpreting the machining program from said machining program storing portion;

(4) an initial value setting and storing portion for setting and storing initial values for tool data and other data;

(5) a machining propriety judging portion and (6) a shaft motion computing portion for taking in data from said initial value setting and storing portion and for computing shaft motion signals based on the machining mode selected by said machining mode judging portion.

3. An eccentric-shape machining apparatus as defined in claim 2 wherein when the workpiece is to be bored and when it is assumed that x is a position in the biting direction; A is a distance between the rotational center of a workpiece and the center of a bore to be machined; r is the radius of a bore to be machined; and d is a turning radius in a cutting tool, (1) said machining propriety judging portion being adapted to judge whether or not r>d or A≠r;

(2) said machining mode judging portion being adapted to judge that the machining mode is the workpiece rotation mode or workpiece oscillation mode by judging that A<r;

(3) when the machining mode is the workpiece rotation mode, based on the previously determined rotational phase $\theta 1$ of said workpiece, said shaft motion computing portion being adapted to compute the rotational phase $\theta 2$ of said rotating tool spindle by the use of $$\theta 2 = \sin^{-1}\{A\sin\theta 1/(r-d)\},$$

said shaft motion computing portion being adapted to compute the position in the biting direction the use of $$x = (r-d)\cos\theta 2 - A\cos\theta 1, \text{ and}$$

said shaft motion computing portion being adapted to compute the position in the feed direction by the use of $$z = \{(\theta 1 - \theta 2)/360°\}p.$$

4. An eccentric-shape machining apparatus as defined in claim 2 wherein when the external diameter of the workpiece is to be machined and when it is assumed that x is a position in the biting direction; A is a distance between the rotational center of a workpiece and the central axis of a shaft to be machined; r is the radius of the shaft to be machined; and d is a turning radius of a cutting tool, (1) said machining propriety judging portion being adapted to judge whether or not A<r; and (2) based on the previously determined rotational phase $\theta 1$ of said workpiece, said shaft motion computing portion being adapted to compute the rotational phase $\theta 2$ of said rotating tool spindle by the use of $$\theta 2 = \sin^{-1}\{A\sin\theta 1/(r+d)\},$$

said shaft motion computing portion being adapted to compute the position in the biting direction the use of $$x = (r+d)\cos\theta 2 - A\cos\theta 1, \text{ and}$$

said shaft motion computing portion being adapted to compute the position in the feed direction by the use of $$z = \{(\theta 1 - \theta 2)/360°\}p.$$

5. An eccentric-shape machining apparatus for machining a workpiece, including boring, contour shaping, threading and so on, about a position different from the rotational center of the workpiece, comprising:

(1) a main spindle on which a chuck for holding said workpiece is mounted and which is controllably rotatable about a C-axis;

(2) a turret type cutting head controllably movable in a direction perpendicular to said C-axis (X-axis direction);

(3) a turret mounted on said turret type cutting head and controllably rotatable about a Ct-axis parallel to said C-axis, said turret including a cutting tool mounted thereon in a direction perpendicular to said Ct-axis;

(4) a rotating tool spindle mounted on said turret in a direction parallel to the Ct-axis of said turret and controllably rotatable about an Ma-axis parallel to said Ct-axis, said rotating tool spindle including a cutting tool mounted thereon in a direction perpendicular to said Ct-axis;

(5) main spindle drive means for rotatably driving said main spindle while controlling the rotational phase ($\theta 1$) of said workpiece about said C-axis;

(6) turret type cutting head drive means for controllably moving said turret type cutting head in said X-axis direction;

(7) turret drive means for rotatably driving said turret while controlling the rotational phase ($\theta5$) of said turret about said Ct-axis;

(8) rotating tool spindle drive means for rotatably driving said rotating tool spindle while controlling the rotational phase ($\theta4$) of said rotating tool spindle about said Ma-axis; and (9) numerical control means for controlling all said drive means such that the tip of said cutting tool is positioned on said X-axis and the rake angle of said cutting tool is maintained at a constant angle relative to a tangent line at a cutting point on a cutting plane.

6. An eccentric-shape machining method for machining a workpiece, including boring, contour shaping, threading and so on, about a position different from the rotational center of the workpiece, to form a surface having a radius, comprising the steps of:

generating a composite motion by simultaneously controlling motions in the C-axis being a control axis for controlling the rotational phase of said workpiece, in the X-axis being a control axis for controlling the position of a turret type cutting head in a direction perpendicular to said C-axis, in the Y-axis being a control axis that extends in a direction perpendicular to both said C- and X-axis directions and is used to control the position of said turret type cutting head and in the Ct-axis being a rotatable control axis extending parallel to said C-axis and used to control the rotational phase of a turret that is mounted on said turret type cutting head and on which a tool is mounted; and using said composite motion to control the cutting operation such that the cutting tip of said tool is positioned in place on said X-axis and the rake angle of said cutting edge is maintained at a given angle relative to a tangent line at a cutting point on a cutting plane wherein the C-axis is spaced from the Ct-axis by a distance X along the X-axis and a distance Y along the Y-axis, the cutting tip of said tool is spaced a distance Z from a reference point along the Z-axis, the position about which the workpiece is machined is offset from the C-axis by a non-zero distance A, $X = A \cos \theta1 + r \cos(\theta3 - \theta1) + L1 \cos \theta2$;
$Y = L1 \sin \theta2$;
$Z = (\theta3/360°)p$;

r = the radius of the surface being machined;
L1 = the distance between the Ct-axis and the cutting tip of said tool;
$\theta1$ = the rotational phase of the workpiece about the C-axis;
$\theta3 = \theta1 + \theta2$; and
p = the displacement of the cutting tip of said tool along the Z-axis during each revolution of the workpiece relative to the cutting tip of said tool.

7. An eccentric-shape machining method for machining a workpiece, including boring, contour shaping, threading and so on, about a position different from the rotational center of the workpiece, comprising the steps of:

generating a composite motion by simultaneously controlling motions in the C-axis being a control axis for controlling the rotational phase of said workpiece, in the X-axis being a control axis for controlling the position of a turret type cutting head in a direction perpendicular to said C-axis, in the Ct-axis being a rotatable control axis extending parallel to said C-axis and used to control the rotational phase of a turret that is mounted on said turret type cutting head and on which a rotating tool spindle is mounted and in an Ma-axis being a rotatable control axis used to control the rotational phase of said rotating tool spindle and extending parallel to said Ct-axis; and using said composite motion to control the cutting operation such that the cutting tip of said tool is positioned in place on said X-axis and the rake angle of said cutting edge is maintained at a given angle relative to a tangent line at a cutting point on a cutting plane.

8. An eccentric-shape machining apparatus for machining a workpiece, including boring, contour shaping, threading and so on, about a position different from the rotational center of the workpiece, said apparatus comprising:

(1) a main spindle on which a chuck for holding the workpiece is mounted;

(2) a rotating tool spindle on which a cutting tool can be mounted in a direction perpendicular to the axis of the cutting tool;

(3) main spindle drive means for rotatably driving the main spindle while controlling the rotational phase ($\theta1$) of the workpiece;

(4) rotating tool spindle drive means for rotatably driving the rotating tool spindle while controlling the rotational phase ($\theta2$) of the rotating tool spindle;

(5) feed drive means for feeding the rotating tool spindle relative to the workpiece in a biting direction (X-axis direction) and in a feed direction (Z-axis direction) while controlling the position of the rotating tool spindle; and (6) numerical control means for controlling the rotational phases of the workpiece and rotating tool spindle in synchronism with the biting movement of the rotating tool spindle such that the cutting tool is brought into contact with the inner or outer periphery of the workpiece with a given depth of cut during one complete revolution of said rotating tool spindle and for simultaneously controlling the feed of the rotating tool spindle.

9. An eccentric-shape machining apparatus as defined in claim 8 wherein said numerical control means includes a Machining mode judging portion for judging that the eccentric-shape machining mode is a workpiece oscillation mode if the eccentricity is larger than the machining radius and for judging that the eccentric-shape machining mode is a workpiece rotation mode if the eccentricity is not larger than the machining radius.

10. An eccentric-shape machining apparatus as defined in claim 9 wherein said numerical control means further includes:

(1) a machining program input portion;

(2) a machining program storing portion;

(3) a machining program interpreting portion for reading and interpreting the machining program from said machining program storing portion;

(4) an initial value setting and storing portion for setting and storing initial values for tool data and the other data;

(5) a machining propriety judging portion and (6) a shaft motion computing portion for taking in data from said initial value setting and storing portion and for computing shaft motion signals based on the machining mode selected by said machining mode judging portion.

11. An eccentric-shape machining apparatus as defined in claim 10 wherein when the workpiece is to be bored and when it is assumed that x is a position in the biting direction; A is a distance between the rotational center of a workpiece and the center of a bore to be machined; r is the radius of a bore to be machined; and d is a turning radius of a cutting tool,
(1) said machining propriety judging portion being adapted to judge whether or not $r>d$ or $A \neq r$;
(2) said machining mode judging portion being adapted to judge that the machining mode is the workpiece rotation mode or workpiece oscillation mode by judging that $A<r$;
(3) when the machining mode is the workpiece oscillation mode, based on the previously determined rotational phase $\theta 2$ of said rotating tool spindle, said shaft motion computing portion being adapted to compute the rotational phase $\theta 1$ of said workpiece by the use of $$\theta 1 = \sin^{-1}\{(r-d)\sin\theta 2/A\},$$

said shaft motion computing portion being adapted to compute the position in the biting direction by the use of $$x = (r-d)\cos\theta 2 + A\cos\theta 1, \text{ and}$$

said shaft motion computing portion being adapted to compute the position in the feed direction by the use of $$z = \theta 2/360° p.$$

* * * * *